April 9, 1963          C. H. HARTFORD          3,084,578
CUTTER
Filed April 17, 1959
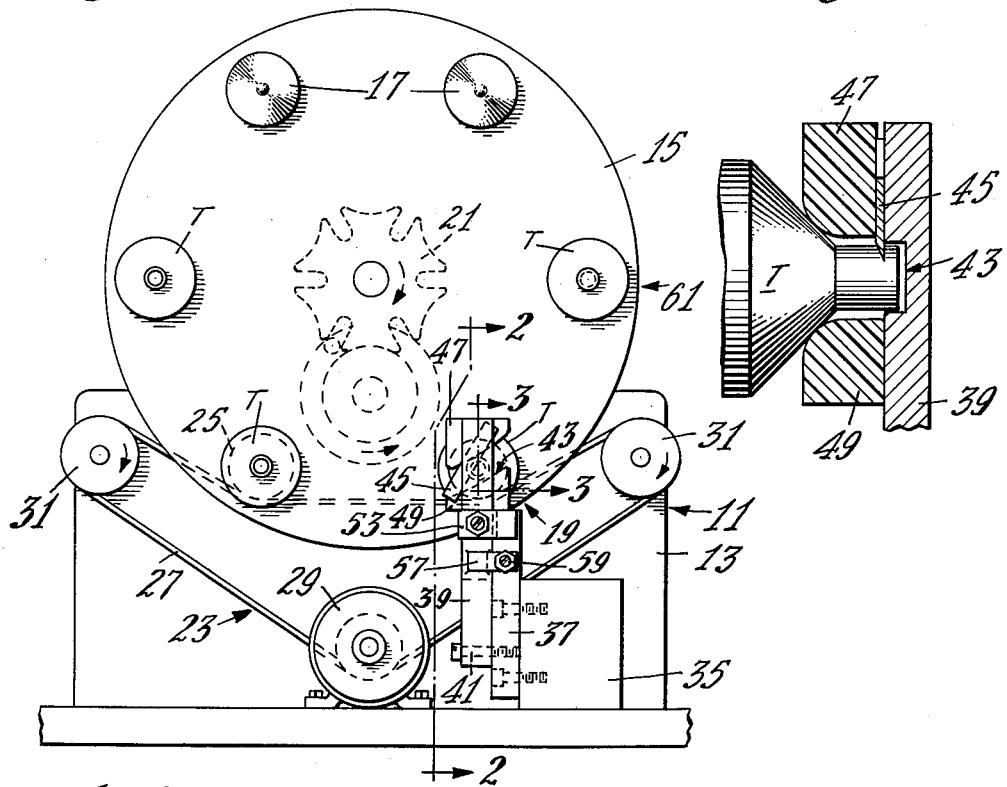
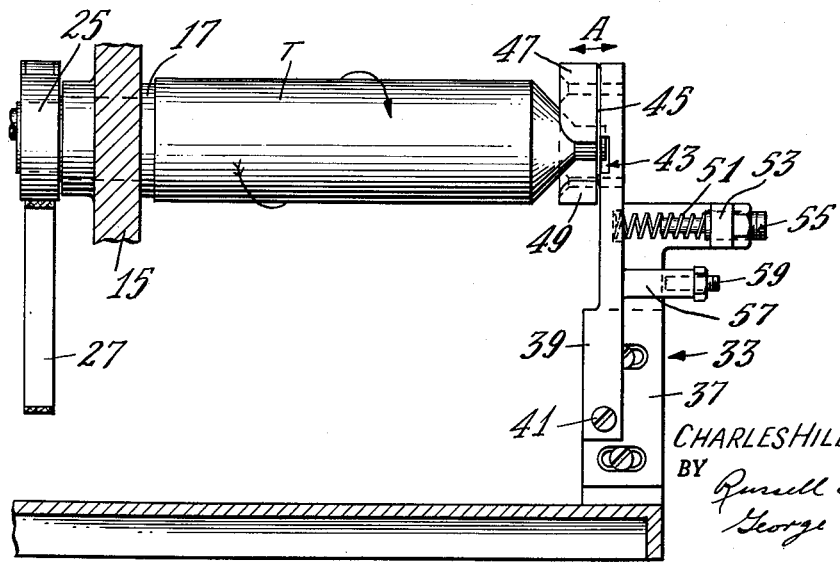
INVENTOR.
CHARLES HILL HARTFORD
BY Russell L. Root
George W. Reiber
ATTORNEYS 3,084,578
CUTTER
Charles Hill Hartford, Maynard, Mass., assignor to American Can Company, New York, N.Y., a corporation of New Jersey
Filed Apr. 17, 1959, Ser. No. 807,121
2 Claims. (Cl. 82—60)

This invention relates to an article cutter, and has particular reference to a device for cutting or trimming the terminal end of the neck of a molded thermoplastic tube.

In the manufacture of a molded plastic article such as a collapsible tube having a flexible tubular body, an integral shoulder and a neck, the molding operation is usually performed by injecting from the neck end which leaves an extended sprue or core which must be removed before the tube is finally completed. In order to achieve the desired result and also expose the formed dispensing opening in the neck and provide a smooth sealing area at the end of the neck surrounding the opening, trimming or cutting of the excess plastic from the end of the neck is required and it is to the accomplishment of this trimming operation in a rapid and accurate fashion that the present invention is directed.

In the handling of tubular containers especially collapsible tubes, it is frequently convenient to mount the tubes on rather snugly fitting spindles or mandrels which can be conveyed in a series transversely of their lengths into and out of one or more work stations for finishing operations such as trimming, threading, capping, printing and the like, and which are rotated at one or more stations to assist in the work. Usually, although not necessarily, the mandrels are mounted on a turret to project axially therefrom, and the turret is rotatively indexed periodically by any convenient indexing mechanism. When the cutting of the tube neck is conducted on the mandrels of a machine of this type it has proved a distinct problem to cut all tubes of the same type with sufficient uniformity to meet commercial requirements. It has been found that even quite slight deviations in cutting level produce results whose inferiority is quite readily detectable by a quick visual inspection. These may come about due to slight difference in mandrel length, or failure of the tubes to seat uniformly on the mandrels during placement, but from whatever source, there has been need to provide correction.

An object of the present invention is to provide a structurally simple article cutter adapted to trim or cut terminal ends from articles presented to it.

Another object of the invention is to provide for accurately cutting the article at a predetermined level with respect to its own configuration.

Another object is to provide for accurate cutting of an article in a simple and effective manner with a minimum of complexity.

A further object is to provide for cutting of tube necks by a simple attachment to the usual tube finishing machine.

A feature of the invention is the arrangement of the cutter to adapt itself to each article in turn and to gauge its proper cutting position by detector means which sense the article position.

Other objects, features and advantages will appear hereinafter as the description proceeds.

In the drawing:

FIG. 1 is a front elevation of the turret of the usual tube finishing machine showing a cutter embodying the present invention applied thereto;

FIG. 2 is detail side elevation to a larger scale partly in section, taken substantially on line 2—2 of FIG. 1;

FIG. 3 is a detail section through the cutter head to a still larger scale, and taken substantially on line 3—3 of FIG. 1.

Referring to the drawing, FIG. 1 illustrates a tube finishing machine 11 of the usual type consisting of a frame 13 rotatably carrying a turret 15 upon which are rotatably mounted a plurality of mandrels 17. The turret 15 may be intermittently rotated to bring each of the spindles 17 in turn into various work stations, one of which is indicated at 19, by a suitable indexing device, for example a Geneva drive 21. When each mandrel reaches the work station 19, it is rotated by a suitable mechanism for the purpose. In the form shown this mechanism is designated 23 and includes a drive pulley 25 on the base end of each mandrel which runs in frictional contact with a driving belt 27 driven by motor 29 and supported by idlers 31.

The articles to be worked on, here shown as containers of the collapsible tube type and designated T, are placed on the mandrels 17 and indexed in turn into the work station 19.

A cutter assembly according to the present invention is designated generally 33, and is supported on the frame in proximity to the end of the spindle 17 which is at the work position 19. For this purpose any suitable mount such as block 35 is provided. The cutter assembly includes a fixed support element 37 and a movable member or arm 39 pivoted to the support element at 41 so as to swing towards and away from the spindle as indicated by arrows A.

The free end of the arm 39 is provided with a groove or throat 43, in a configuration permitting passage of the tip of a tube or article as it moves past the cutter due to the indexing motion of the turret 15. Extending across the throat 43 is a fixed cutter blade 45 positioned to intercept the tip of a tube T and sever it from the main body of the tube.

On the face of the arm 39 at either side of throat 43 are mounted smooth blocks 47 and 49 of rounded-off contour which serve as guides and depth gauges. As best seen in FIG. 3, the blocks 47 and 49 are dimensioned so as to come into contact with some transversely disposed portion of the article, for example the breast of a collapsible tube T and thus determine the degree of penetration into the throat and hence the level at which the cutter 45 shall work. Preferably the blocks 47 and 49 are of material soft enough to prevent marring, marking or damaging the tube T, and sufficiently abrasion resistant to avoid excessively rapid wear and necessity for frequent replacement. At present the material preferred for this use is nylon, although some other synthetic resins will perform equally well.

The arm 39 is urged transversely of the cutter plane towards the turret 15 by compression spring 51 which rests against suitable perch 53 on support element 37. The perch 53 may also include an adjustment screw 55 for controlling spring tension if desired. Spring 51 thus serves to hold gauge blocks 47 and 49 against the article or tube T whenever one is positioned at station 19. There is also provided, between the arm 39 and support element 37, stop means to prevent excessive throw of the arm towards the turret during indexing. In the form shown this includes a hook 57 carrying an adjustable stop screw 59 which strikes against the body of support element 37 and can be set to allow the arm freedom to swing towards the turret only slightly more than when the gauge blocks 47 and 49 are in contact with an article.

Preferably the position of the cutter assembly peripherally of the turret is arranged as shown in FIG. 1 of the drawing, with the blade 45 positioned to penetrate just a little more than through the thickness of the tube neck when the approaching mandrel reaches station 19. Cutting is then accomplished mainly due to rotation of the tube T against the blade 45 by the mandrel rotation. It will be understood, however, that in certain applications, the cutter can be otherwise disposed, especially where the part to be cut is of small cross section or of relatively easily cut material. In such cases, if desired, the mounting can be such that the portion of the article to be cut enters the throat 43 between stations while the turret is indexing so that cutting is effected mainly by the relative translation of the article and the blade 45, although rotation of the article may also be employed in this connection if desired.

In operation the turret 15 is indexed periodically by the Geneva movement 21, and each mandrel in turn is brought to the work station 19. At a previous station, for example that designated 61, a fresh tube with uncut tip can be placed on the mandrel each time the turret indexes. As the tube is moved into station 19 its tip enters the throat 43 and the gauge blocks 47 and 49 move into contact with the tube breast, camming the arm 39 through a very small angle away from the turret so as to lift stop 59 off its rest point and slightly compressing spring 51. As the mandrel reaches rest position, blade 45 cuts into the material of the tip of tube T, and rotation of the mandrel by belt 27 and motor 29 causes the tip to be cut all around and the waste portion drops free. When cutting has been completed the tube is indexed to other stations, some of which may be used for other work operations such as printing or capping, and ultimately to a station where the tube may be doffed in any convenient manner.

From the foregoing description it can be seen that I have provided a cutter which while simple in structure and made of few parts, acts effectively to provide reliable cutting when accuracy of cut at a carefully predetermined spot is essential.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. Apparatus for severing to a predetermined length the neck end of a tubular shape, comprising a supporting framework, a turret mounted for rotation by said framework, a plurality of mandrels supported by said turret for mounting tubular shapes prior to, during and upon completion of the neck end severing operation, a rigid support member erected upwardly from said supporting framework in spaced relation to one face of said turret, an elongated arm member pivotally connected at one end to said rigid member for generally arcuate swinging movement toward and away from said mandrels during rotation of said turret, said elongated arm member adjacent the opposite end thereof being provided with an obliquely disposed slot for receiving the tip portion of a neck end during rotation of said turret with uncut tubular shapes supported on said mandrels, a cutter connected to said swingable arm member and disposed to be contacted by a neck end as it moves into said slot, and a pair of generally flat and substantially triangular spaced guide blocks attached to said elongated arm member along said opposite end thereof and directly engageable with a tubular shape adjacent the neck end thereof for swinging said arm member and cutter connected thereto so as to locate the cutter at a predetermined point along the length of a neck end regardless of the particular positioning of tubular shapes upon the mandrels.

2. Severing apparatus of the character defined in claim 1, in which resilient means are mounted by said rigid support member and bear against said elongated arm member for urging said latter member toward a tubular shape when the tip portion of a neck end thereof is received in said slot, and also in which cooperating stop means are provided on said elongated arm member and on said fixed support member for limiting swinging movement of said arm member in response to the action of said resilient means.

References Cited in the file of this patent

UNITED STATES PATENTS

| | | |
|---|---|---|
| 96,912 | Halliwell | Nov. 16, 1869 |
| 678,901 | Prael | July 23, 1901 |
| 939,144 | Lysaght | Nov. 2, 1909 |
| 954,955 | Grossman | Apr. 12, 1910 |
| 1,852,831 | Young | Apr. 5, 1932 |
| 1,934,660 | Fairchild | Nov. 7, 1933 |
| 1,963,280 | Prussing | June 19, 1934 |
| 2,061,581 | Lippincott | Nov. 24, 1936 |
| 2,114,272 | Temple | Apr. 12, 1938 |
| 2,298,366 | Gladfelter | Oct. 13, 1942 |
| 2,321,735 | Clifford | June 15, 1943 |
| 2,702,597 | Wickwire | Feb. 22, 1955 |

FOREIGN PATENTS

| | | |
|---|---|---|
| 560,380 | Great Britain | Apr. 3, 1944 |